Nov. 22, 1966 E. POUMAKIS 3,286,895

MAGNETIC TAPE DRIVING MEANS

Filed July 31, 1964

INVENTOR.
ELEUTHERE POUMAKIS

BY Douglas M. Clarkson
ATTORNEY 3,286,895
Patented Nov. 22, 1966

3,286,895

MAGNETIC TAPE DRIVING MEANS

Eleuthere Poumakis, East Islip, N.Y., assignor to Potter Instrument Company, Inc., Plainview, N.Y., a corporation of New York Filed July 31, 1964, Ser. No. 386,684
5 Claims. (Cl. 226—95)

The present invention, generally, relates to magnetic tape driving means and, more particularly, to new and improved magnetic tape drive capstan assembly.

When a capstan is used to drive a magnetic tape at high speeds without the aid of a pinch roller, the magnetic tape has a tendency to float over the surface of the capstan, resulting in slippage between the tape and the capstan. This slippage causes variations in speed between the driving means of the magnetic tape apparatus and the tape itself, which tends to upset the timing of the information transferring operation.

The slippage referred to above is due, in part, to the existence of an air cushion or film which normally exists between the tape and the capstan in high speed operation. A laminar layer of air clings to the outside surface of the capstan providing an undesired lubrication for the tape. This lubrication decreases the friction between the capstan and the tape, and since tape movement relies on frictional contact for its drive, it can be seen that the tape will travel more slowly than the driving surface of the capstan and will speed up momentarily upon closer contact with the capstan.

In order to overcome this problem, it has been proposed to provide capstans with a hollow chamber and to form openings from the chamber to the periphery or outer circumference of the capstan. In this manner, passages are formed between the capstan-engaging surface of the magnetic tape and the interior of the capstan, and upon the provision of suction means connected to the interior of the capstan, the air film will be decreased. However, such a hollow capstan requires extra and more exacting machining, as well as the provision of a suction passage leading into the capstan. Such machining adds to the cost of the capstan drive assembly, and the suction passage leading into the capstan requires a rotary seal between the capstan and its mounting means.

A principal object of the present invention is to provide an improved capstan assembly for driving a magnetic tape, which assembly alleviates the problem of slippage between the tape and capstan.

Another object of this invention is the provision of a magnetic tape driving capstan assembly in which the traction between the capstan and the tape is increased.

A further object of this invention is to provide an increase in friction between the outer surface of a magnetic tape driving capstan assembly and the inner surface of the magnetic tape.

A still further object of this invention is the provision of an improved magnetic tape driving capstan assembly which is simple in construction and economical to manufacture.

The foregoing and other objects and advantages of this invention are obtained by providing a capstan assembly for driving magnetic tapes which has grooves running circumferentially around its outer surface. The grooves aid to eliminate the normal air film which develops between the capstan and the magnetic tape when the capstan is operated at high speeds. Such a grooved capstan breaks up the layer of air surrounding the rotating capstan and permits the tops of the grooves to directly engage the tape.

A vacuum pocket, in accordance with the invention, is provided adjacent to the capstan, which causes the grooves to act as vacuum ducts to conduct the vacuum around the capstan tape-engaging portion. This action pulls the tape into firmer engagement with the capstan and, thereby, provides greater traction between the capstan and the tape at high speeds. This firmer engagement, in turn, permits operation with a very small wrap angle of the tape.

A better understanding of the present invention, as well as further objects and advantages of the invention, will become more readily apparent as the following detailed description unfolds and when taken in conjunction with the accompanying drawings, wherein.

Figure 1:
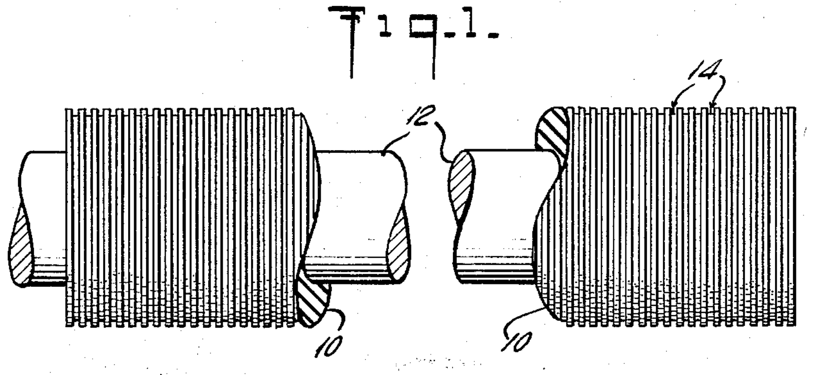
FIG. 1 is an enlarged view, partly in section, of an embodiment of the capstan of the present invention.
Figure 3:
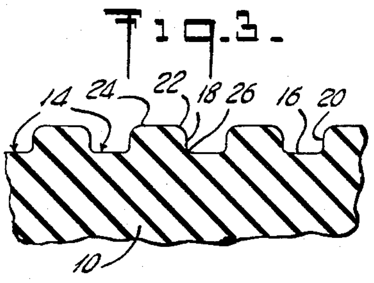
FIG. 3 is a magnified view of the capstan grooved surface.

With reference now to the drawings, FIGS. 1 and 3 illustrate a preferred embodiment of a capstan surface in accordance with the present invention. A capstan indicated generally by the reference numeral 10, is shown in FIG. 1 as being mounted on a shaft 12 to be driven thereby. While the capstan 10 may be formed of any suitable material, it is preferably made of rubber to provide a high coefficient of friction between the capstan and a magnetic tape. If desired, the capstan can also be manufactured of metal and provided with a rubber coating to achieve the favorable frictional characteristics between the capstan and a tape.

While none is illustrated, it will be understood readily that the rotor 12 can be connected to any high, constant speed motor to impart the necessary velocity of the capstan 10.

As mentioned previously above, when the capstan 10 is rotated at high speeds, an air film is formed between the outer surface of the capstan 10 and the magnetic tape which it is driving. To help eliminate this air film and to provide a more positive engagement between the capstan 12 and the magnetic tape, a plurality of generally parallel grooves 14 are formed in the outer surface of the capstan 10 and run circumferentially around its surface.

As shown in the magnified section view of FIG. 3, these grooves have a bottom 16 and sides 18 and 20, with a top corner 22 rounded between the side 18 and the top surface 24 of the capstan 10, as is the bottom corner 26 between the side 18 and the bottom 16 of the groove 14. The corners on the right-hand side of the groove 14, as depicted in FIG. 3, are rounded also, as are the corners of all the grooves 14 of the capstan 10.

Figure 2:
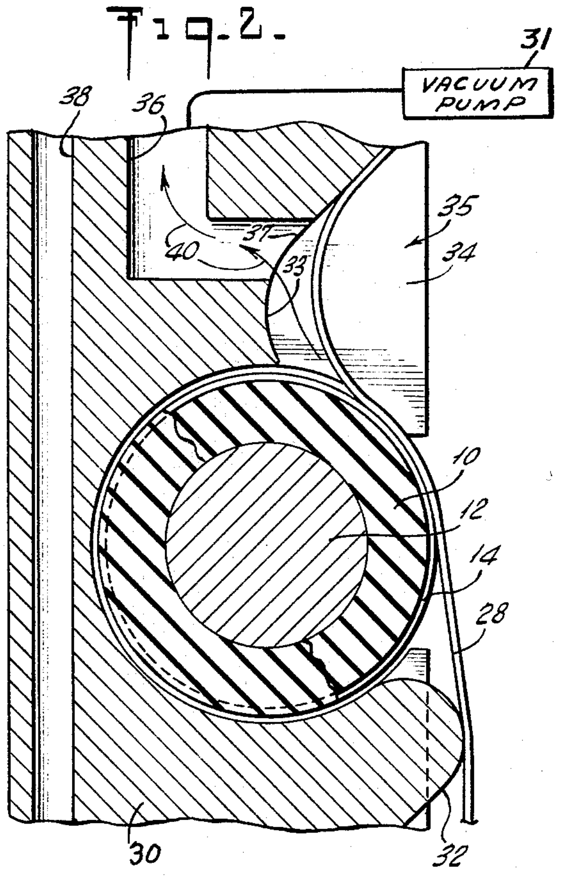
FIG. 2 is a sectional view of a tape driving unit utilizing the capstan assembly of the present invention.

In FIG. 2, there is shown a drive assembly utilizing the capstan 10 in operative engagement with a magnetic tape 28. The capstan 10 and the shaft 12 are mounted rotably in a drive block 30, the drive block 30 having a forwardly extending contoured guide 32 for the magnetic tape 28 and also acts to displace the magnetic tape 28 away from the outer surface of the capstan 10 when the tape is not being driven.

On the other side of the capstan 10 from the guide 32 is a contoured depression 33 which extends rearwardly from the forward edge of the drive block 30 and is of a width equal to the width of the tape to be driven by the capstan 10. The contoured depression 33, along with a pair of plates 34 on each side of the drive block 30, and the capstan 10 itself, define a pocket 35 formed in the drive block 30. Only one of the plates 34 is shown.

Extending rearwardly from the contoured depression 33 is a passageway 36 formed in the drive block 30. The passageway 36 has an opening 37 to permit the passage of air from the pocket 35 therethrough. A second passageway 38 is provided along the rear portion of the drive block 30 which is connected to another pocket (not shown). This second passageway and pocket are operative to pull the magnetic tape 28 away from the capstan 10 and over the contoured edge 32 when the tape 28 is not in operative engagement with the capstan 10.

For a description of the operation of the overall magnetic tape system, as well as the operation of the drive block and tape, reference may be had to copending application, Serial No. 385,727, filed July 28, 1964, entitled, Random Access Information Storage Device, and invented by Andrew Gabor.

Briefly, the capstan 10 is constantly rotating in a counterclockwise direction, and the tape 28 is caused to move by bringing it into contact with the capstan 10. As described in the aforementioned application, this is accomplished by creating a vacuum or suction through the passageway 36 by means of a suitable vacuum pump 31 known in the art. Air will thus be drawn through the passageway 36, the opening 37 and the pocket 35, creating a pull on the magnetic tape 28 which results in the tape being drawn into the pocket 35 and into contact with the capstan 10 to be driven directly thereby, as shown in FIG. 2.

Since that portion of the outer surface of the capstan 10 which is immediately adjacent the depression 33 of the drive block 30 also forms a wall of the pocket 35, the air drawn in through the opening 37 and the passageway 36, as indicated by the arrows 40, is also drawn through the grooves 14. The suction created in the grooves 14 causes the magnetic tape 28 to be drawn into more intimate contact with the outer surface 24 (FIG. 3) of the capstan 10. Because of the flexibility of the magnetic tape 28, the tape is pulled slightly into the grooves 14 and forms around the rounded top corners 22 of the grooves thus creating excellent traction.

Accordingly, the present invention provides structure which is simple, yet reliable to perform its desired function, namely to prevent slippage between a magnetic tape and a capstan. By utilizing circumferential grooves on a capstan in conjunction with the vacuum pocket adjacent to the capstan, an effective frictional engagement between the magnetic tape and capstan is provided, as well as a control over engagement of the tape with the capstan.

The above description is of a preferred embodiment of the invention, and many modifications may be made thereto without departing from the spirit and scope of the invention which is defined in the appended claims.

What is claimed is:

1. A magnetic tape drive assembly comprising,
a magnetic tape,
a drive block defining a pocket adjacent to said tape,
a capstan for driving a magnetic tape positioned to form a part of the wall of said pocket, said capstan having a plurality of circumferentially extending grooves thereon, and
a vacuum distribution system for applying a vacuum to said pocket thereby creating a suction to draw said tape into said pocket and causing said grooves to act as vacuum ducts to urge said tape into firmer contact with the outer surface of said capstan.

2. A magnetic tape drive assembly as defined in claim 1, wherein said capstan is made of rubber to provide a better traction between said capstan and said tape.

3. A magnetic tape drive assembly as defined in claim 2, wherein said grooves are formed with rounded corners between the groove side portions and the outer surface of the capstan to thereby result in said tape being urged into said grooves by the vacuum of said vacuum distribution system.

4. A magnetic tape driving assembly comprising,
a drive block,
a capstan for driving a magnetic tape mounted on said drive block and having a plurality of circumferential grooves thereon,
a magnetic tape mounted for operative engagement with said capstan,
a contoured depression formed in said drive block adjacent to the capstan, said depression forming a pocket in said drive block, and
means to create a vacuum in said pocket to thereby cause the grooves of said capstan to act as vacuum ducts to urge said magnetic tape into direct contact with the outer surface of said capstan.

5. A magnetic tape drive assembly comprising,
a magnetic tape,
a drive block defining a pocket,
a shaft mounted in said drive block and adapted to revolve at high speeds,
a capstan for driving a magnetic tape connected to said shaft and positioned adjacent to said pocket to form a part of the wall thereof, said capstan having a plurality of circumferential grooves formed in the periphery thereof, and
a passageway formed in said drive block for connection to a vacuum source and having an opening into said pocket,
whereupon the application of suction through said passageway to said opening the tape is urged into said pocket and the grooves act as vacuum ducts to urge the tape into firm engagement with the periphery of said capstan thereby eliminating an air cushion formed between said tape and capstan at high rotational speeds.

References Cited by the Examiner

UNITED STATES PATENTS

| | | | |
|---|---|---|---|
| 2,624,574 | 1/1953 | Camras | 226—183 X |
| 2,675,185 | 4/1954 | Zenner. | |
| 3,142,240 | 7/1964 | Brownscombe | 226—95 X |
| 3,185,365 | 5/1965 | Rayfield et al. | 242—55.12 X |

FOREIGN PATENTS

| | | |
|---|---|---|
| 677,882 | 7/1939 | Germany. |

ROBERT B. REEVES, *Primary Examiner.*